(12) United States Patent
Wang et al.

(10) Patent No.: US 6,256,597 B1
(45) Date of Patent: Jul. 3, 2001

(54) THREE DIMENSIONAL SPRAY COATING METHOD AND SIMULATION

(75) Inventors: Hsin-Pang Wang, Rexford; Erin Marie Perry, Niskayuna; Michael Charles Ostrowski, Glenville, all of NY (US); Andrew James Worsey, Brentwood, TN (US); Sharon Trombly Swede, Piedmont, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/113,742

(22) Filed: Jul. 10, 1998

(51) Int. Cl.[7] .............................. G06F 9/455; G06F 17/50
(52) U.S. Cl. ...................................... 703/2; 703/7; 703/22; 700/283; 901/43
(58) Field of Search .................................. 703/2, 6, 7, 9, 703/22; 219/121.47; 427/446, 295, 328, 455, 456, 576; 700/98, 163, 283; 901/43

(56) References Cited

U.S. PATENT DOCUMENTS

| | | | |
|---|---|---|---|
| 4,360,886 | * 11/1982 | Kostas et al. | 700/264 |
| 5,458,265 | * 10/1995 | Hester et al. | 223/72 |
| 5,770,273 | * 6/1998 | Offer et al. | 427/455 |

OTHER PUBLICATIONS

E. Goodman et al., A Method for Accurate Simulation of Robotic Spray Application Using Empirical Parameterization, Proceedings of the 1991 IEEE international Conference on Robotics and Automation, Apr. 1991, pp. 1357–1368.*

S.–H. Suh et al., Development of an Automatic Trajectory Planning System (ATPS) for Spray Painting Robots, Proceedings of the 1991 IEEE International Conference on Robotics and Automation, Apr. 1991, pp. 1948–1955.*

W. Mallener et al., Plasma–Sprayed Coatings for Plasma–Facing Components, Fusion Engineering, 17th IEEE/NPSS Symposium, vol. 2, 1998, pp. 884–887, Jul. 1998.*

K. Adamiak et al., Simulation of Particle Trajectories in Tribo–Powder Coating, Conference Record of the 1995 IEEE Industry Applications Conference, 30th IAS Annual Meeting, IAS '95, vol. 2, pp. 1273–1279, Apr. 1991.*

* cited by examiner

*Primary Examiner*—Kevin Teska
*Assistant Examiner*—Russell W. Frejd
(74) *Attorney, Agent, or Firm*—Patrick K. Patnode; Donald S. Ingraham (57) ABSTRACT

A spray coating simulation for a robotic spray gun assembly imports a discretized model of an object geometry. Next, the simulator imports a numerically characterized spray pattern file and a robot motion file having a plurality of motion positions, dwell times and orientations defining a motion path of the spray gun. The individual motion positions within the motion file are read and a determination is made as to which portions of the object geometry are visible at each motion position. Next, a coating thickness at each visible portion of the object geometry is computed, based on the specified spray pattern data, the dwell time and the orientation of the robot motion path, for each motion position. Finally, the total coating thickness over the object geometry is calculated.

15 Claims, 8 Drawing Sheets

FIG. 13

THREE DIMENSIONAL SPRAY COATING METHOD AND SIMULATION

BACKGROUND OF THE INVENTION

This invention relates generally to spray coating and more specifically to a three dimensional spray coating method and simulation.

A significant problem associated with spray coating processes has been the difficulty in achieving a specified deposit thickness on a substrate surface. The following factors contribute to the difficulties in achieving the specified deposit thickness distribution: the three-dimensional part geometry; the changing characteristics of the spray gun due in part to changes in the process conditions and in part to gun aging with time; and the non-optimized robot motion spray path associated with such coating processes. At present there is no prediction tool available for designing the spray pattern or the gun motion path to accommodate a new three-dimensional part geometry.

As a particular example of a coating process, a plasma spray process involves extremely high temperatures with metal or ceramic powder being directed at a substrate surface. A vacuum plasma spray (VPS) process is used, for example, on turbine buckets to produce coatings that serve as oxidation barriers. The relative motion paths of the turbine bucket and the robot that controls the plasma spray gun are determined based on experience with previously made buckets of similar styles. Excessive experiments to verify the coating thickness distribution, however, cost both time and money.

Currently, the coating thickness distribution on turbine buckets is evaluated by a destructive technique, whereby a certain number of buckets are cut into sections, mounted, polished, and examined under a microscope to determine if their respective thickness distributions are within specified limits. If the thickness distributions are not acceptable, then the robot program or the process conditions are adjusted and the procedure is repeated. This trial-and-error approach is often repeated many times during the process development cycle, especially for new products. In new products, difficulties arise in determining optimum process conditions due to a lack of understanding concerning the interactions of the process variables, the part geometry, and the final coating quality.

Accordingly, there is a need in the art for improved evaluation and control in three dimensional coating processes.

SUMMARY OF THE INVENTION

A spray coating simulation for a robotic spray gun assembly imports a discretized model of an object geometry. Next, the simulator imports a numerically characterized spray pattern file and a robot motion file having a plurality of motion positions, dwell times and orientations defining a motion path of the spray gun. The individual motion positions within the motion file are read and a determination is made as to which portions of the object geometry are visible at each motion position. Next, a coating thickness at each visible portion of the object geometry is computed, based on the specified spray pattern data, the dwell time and the orientation of the robot motion path, for each motion position. Finally, the total coating thickness over the object geometry is calculated.

DETAILED DESCRIPTION OF THE INVENTION

Figure 1:
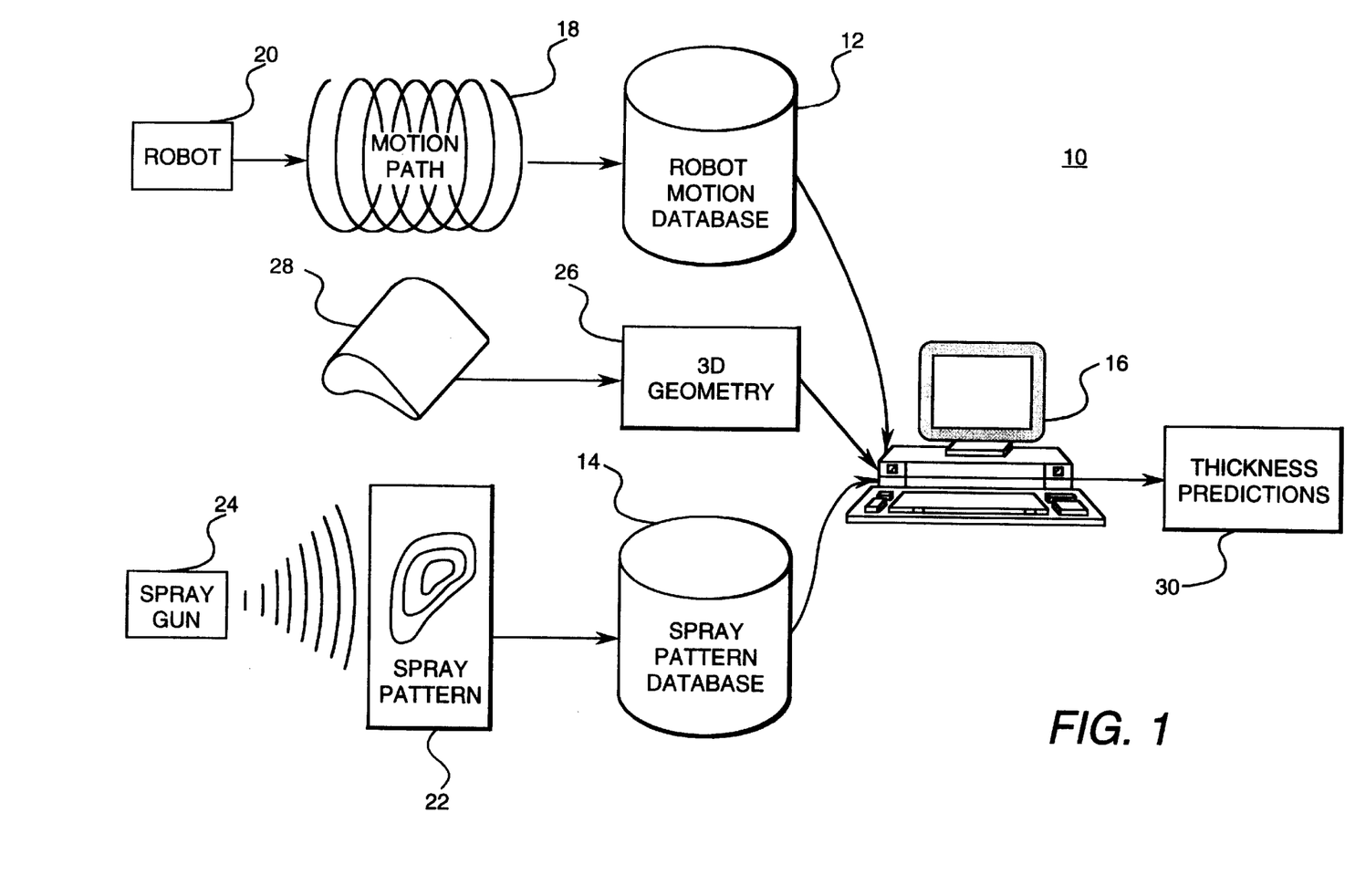
FIG. 1 is a schematic representation of a simulation system for predicting spray coating thickness in accordance with one embodiment of the instant invention.

A simulation system 10 for generating a predicted thickness distribution on the surface of a three dimensional object is depicted in FIG. 1.

Simulation system 10 comprises a robot motion database 12, a spray pattern database 14 and a computer 16.

In general, robot motion database 12 comprises a plurality of motion path files 18 generated by robotic spray-gun systems 20. Spray pattern database 14 comprises a plurality of spray pattern files 22 generated by spray guns 24.

In operation, as discussed in greater detail below, a discretized three-dimensional model 26 of an object to be sprayed 28 is imported into computer 16. Next, a system user selects and imports an appropriate motion path file 18 from robot motion database 12 and an appropriate spray pattern file 22 from spray pattern database 14. The data is utilized within an algorithm, as shown and discussed in FIG. 2, embedded in computer 16 to generate a thickness prediction 30.

Figure 2:
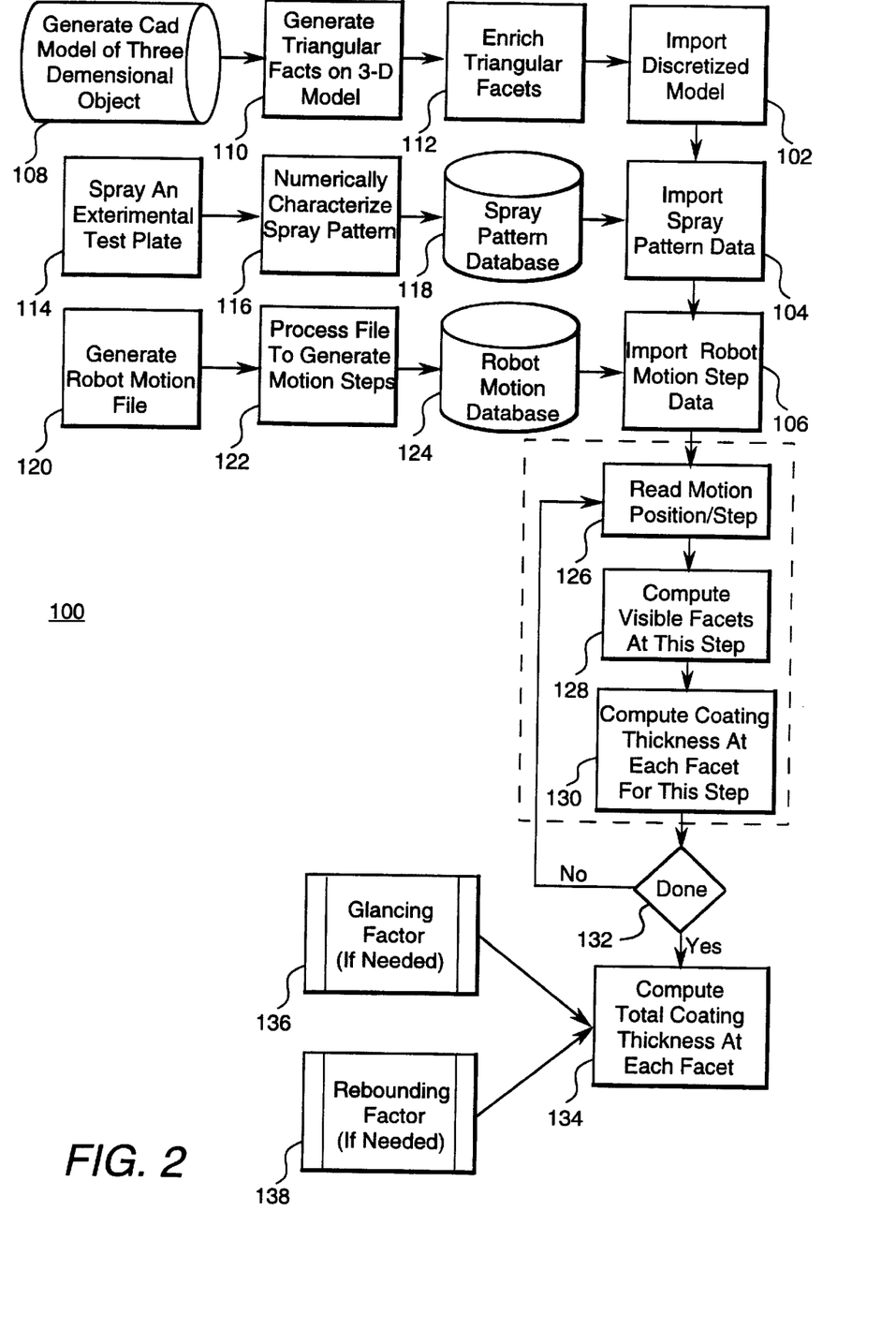
FIG. 2 is a flow chart depicting method steps in accordance with one embodiment of the instant invention.

A method for generating a predicted thickness distribution on the surface of a three-dimensional object, for example a turbine bucket, is depicted in flow chart 100 of FIG. 2. In this invention, the method is embedded typically in the form of algorithms in one or more computers 16 (FIG. 1) such as a workstation. Other types of computers can be used, however, such as a mainframe, a minicomputer, a microcomputer, or a supercomputer. The algorithm performed may be programmed in C, C++, JAVA, Basic, MATLAB, Fortran or other programming languages.

The method described in flow chart 100 includes three preliminary steps: importing a model of the three-dimensional object 102; importing spray pattern data or file 104; and importing robot motion step data or file 106.

Importing a discretized model of the three-dimensional object 102 entails generating a CAD model of a three-dimensional object 108, generating triangular facets, or the like, on the three-dimensional model 110, and enriching the triangular facets 112. Triangular facets are commonly used and can be generated by many commercially available software packages. This methodology, however, can be applied with other types of facets as well.

First, as shown in block 108 of flow chart 100, a three-dimensional model 26 (FIG. 1) of an object 28 (FIG. 1) to be coated is generated, imported or loaded in a standard CAD design program, for example Unigraphics®, Patran®, I-DEAS®, or ProEngineer® within computer 16 (FIG. 1). The generated model 26 will typically consist of surfaces or solids that define the object 28 of interest.

Figure 6:
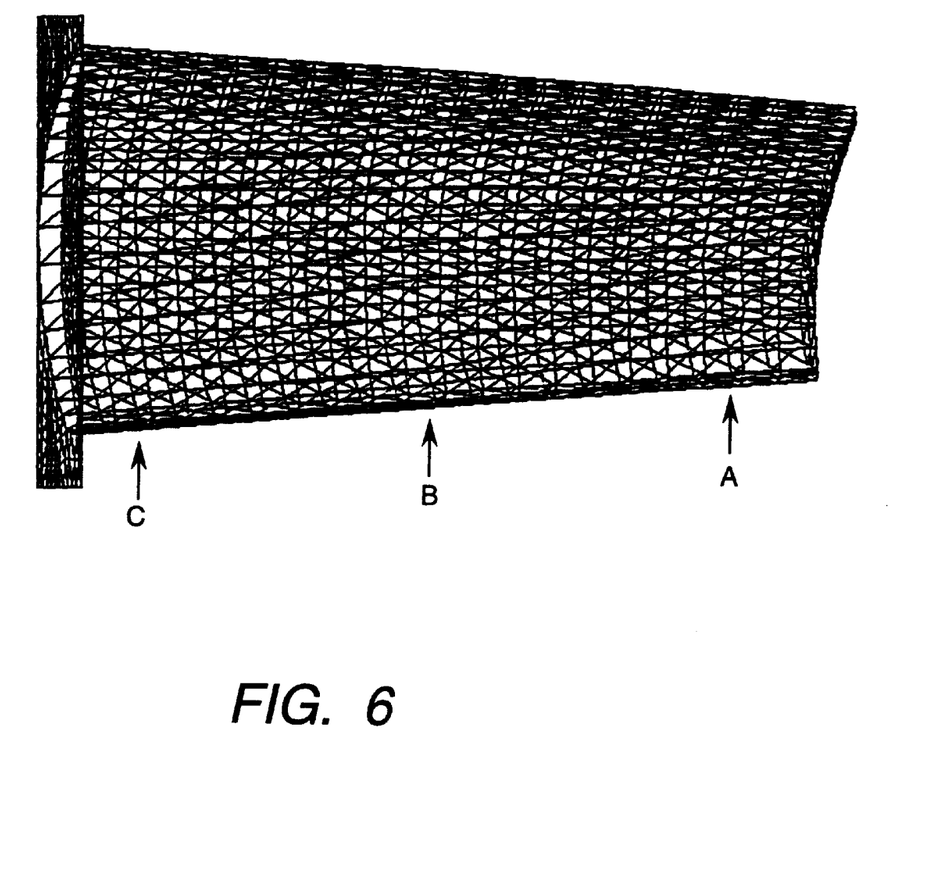
FIG. 6 depicts a representative finite element mesh of an object geometry discretized into triangular facets in accordance with one embodiment of the instant invention.

Next, at block 110 of flow chart 100, the three-dimensional model 26 (FIG. 1) is enveloped with a triangular finite element mesh or the like (as shown in FIG. 6). Any finite element or computer graphics software capable of decomposing a 3D surface into a regular mesh of triangular or otherwise shaped elements, or facets, is sufficient for generating this mesh. Accordingly, the object 28 (FIG. 1) is defined as a discretized geometric representation consisting of triangular shaped facets on the part surface. The smaller the size of each facet, the more accurate the predicted thickness distribution will be.

Next, at block 112 (FIG. 2) the facets disposed upon the three-dimensional model 26 (FIG. 1) are enriched. The enrichment process uses conventional mathematical methods for computing the area, centriod location, facet normals, and so on. The neighboring facet data is computed by determining the common edges and nodes among the facets, and then finding the adjacent facets. Finally, the discretized CAD model is imported to computer 16 (FIG. 1) at block 102 (FIG. 2).

Importing the spray pattern data at block 104 includes spraying experimental test plates at block 114, numerically characterizing these spray patterns at block 116 and generating a spray pattern database at block 118 comprising a plurality of numerically characterized spray pattern files.

Figure 3:
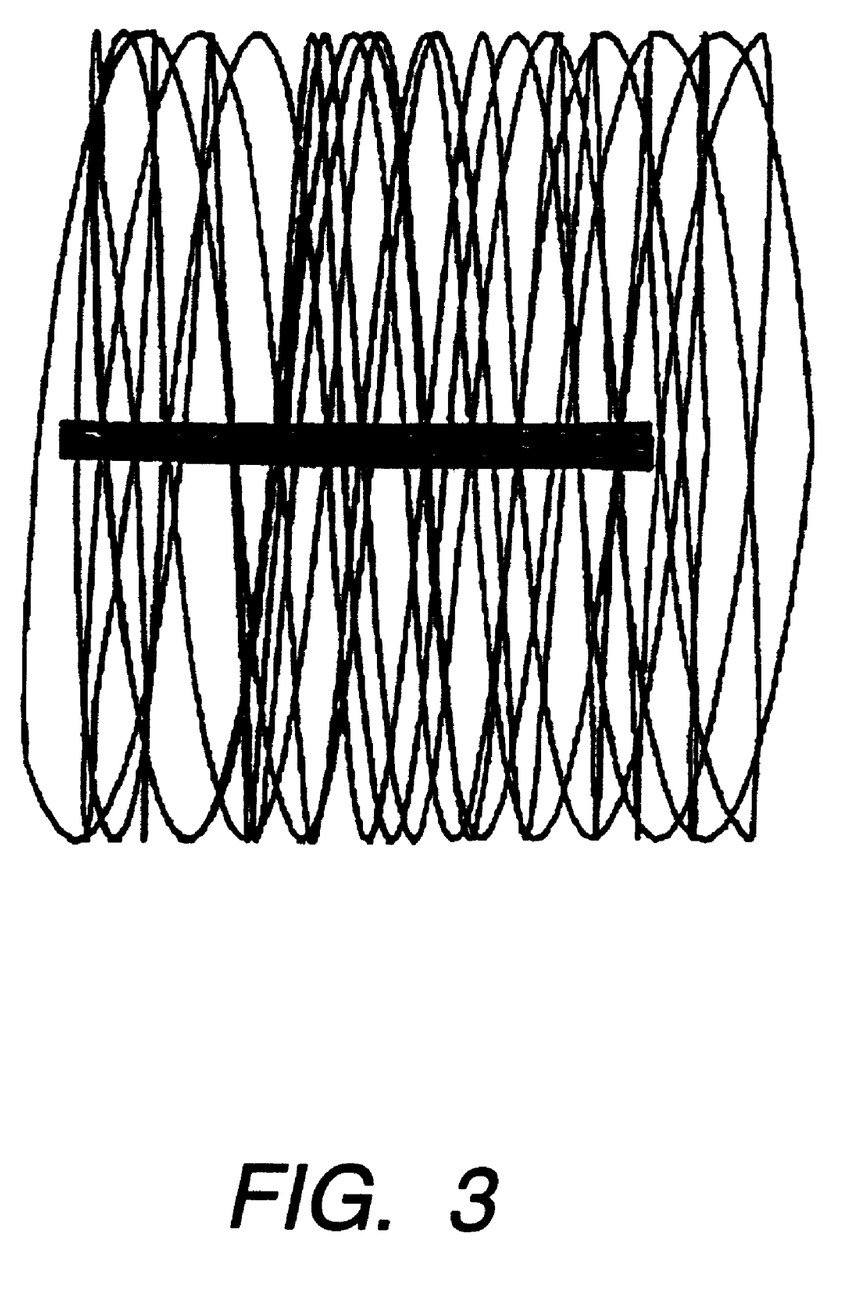
FIG. 3 depicts a representative spray motion file in accordance with one embodiment of the instant invention.

First, at block 114 a series of experimental test plates are sprayed. Flat plates are preheated and held stationary while sprayed with a stationary plasma gun for a fixed period of time. The coating thickness on the plate is measured using a micrometer, or the like, to determine regions of different thickness, which regions are delineated with chalk markings, or the like (as shown in FIG. 3). These spray patterns 22 (FIG. 1) are used to describe respective gun spray characteristics in terms of powder distribution on a flat plate produced by a spray gun 24 (FIG. 1).

Figure 4:
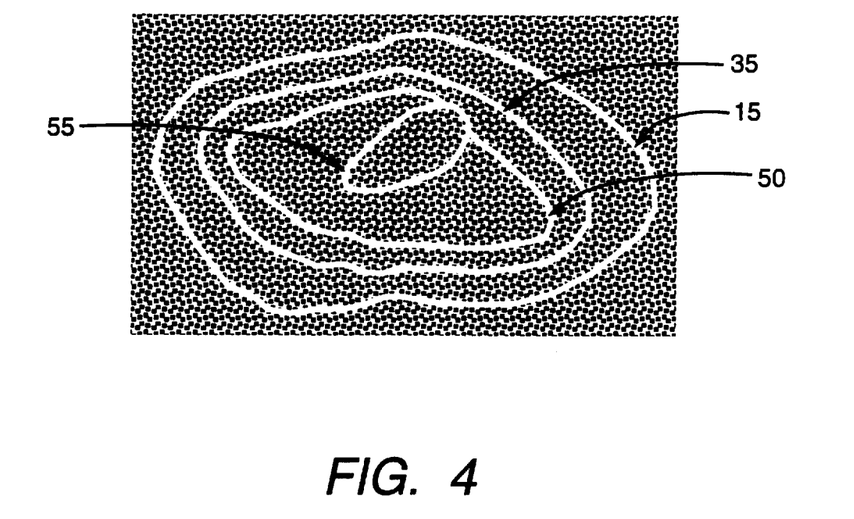
FIG. 4 depicts a representative spray pattern in accordance with one embodiment of the instant invention.
Figure 5:
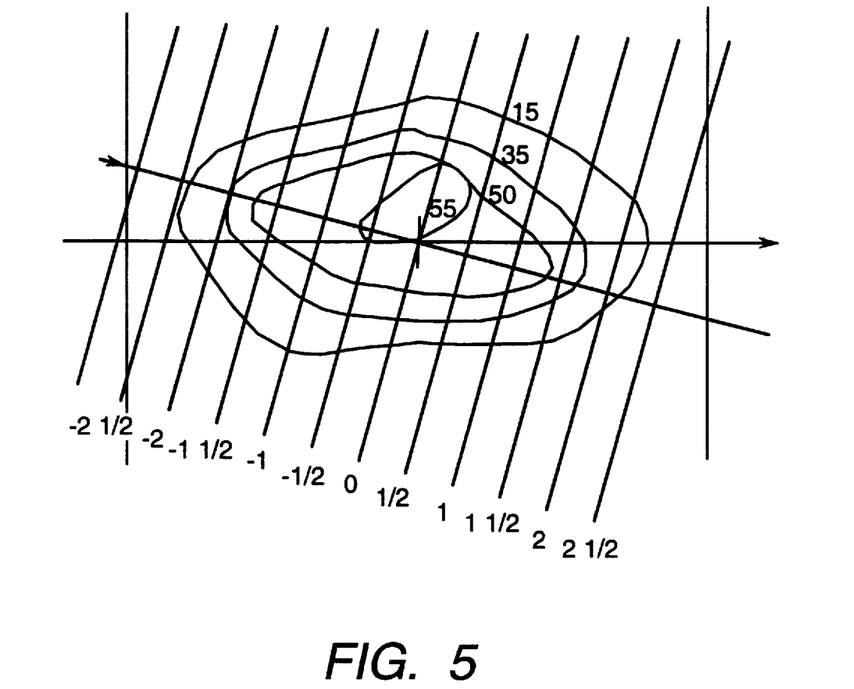
FIG. 5 depicts a representative spray definition for the spray pattern of FIG. 4 in accordance with one embodiment of the instant invention.

Next, at block 116, each spray pattern 22 (FIG. 1) on a respective test plate is numerically characterized (as shown in FIG. 5). The data for each spray pattern 22 consists of a series of $n^{th}$ degree polynomials representing the thickness at various slices through the spray plate, the cone angle of the entire spray pattern 22 and the height at which it was characterized (as shown in FIG. 4). Any other type of mathematical representation of the thickness map for the spray pattern 22 could, however, be incorporated into the geometric tracking module.

Next, at block 118 (FIG. 2), a spray pattern database 14 (FIG. 1) is generated comprising each of the plurality of experimental test plates with numerically characterized spray patterns 22. The empirical approach of characterizing the experimental spray data was developed to bypass modeling the complicated plasma physics, fluid flow, and heat transfer/melting phenomenon that occurs between the plasma and the particles. It is necessary, however, to experimentally generate a database of these spray patterns 22 as a function of the gun conditions (which conditions include the gun model, carrier gas flow rate, gas mixture, current, and powder feed rate) and the powder properties (which properties include the particle size, size distribution, shape, and material). Finally, at block 104, the spray pattern file 22 for the appropriate spray conditions is selected and imported to computer 16 (FIG. 1).

Importing the robot motion step data at block 106 (FIG. 2) comprises generating a robot motion file at block 120, processing the file to generate motion steps at block 122, and generating a robot motion database at block 124. A robot motion step file is defined as a series of discrete positions along the motion path that a typical spray robot follows relative to a stationary geometric object, as well as the time spent in each position (dwell time) and the three-dimensional orientation of the spray nozzle (a vector) relative to the object.

First, at block 120, a plurality of robot motion files 18 (FIG. 1) are generated. Typically, conventional robot spray gun 20 (FIG. 1) programming techniques provide this data in a variety of forms. The data in a robot motion path file 18 is represented in terms of the relative motion of the plasma gun and the geometric object. The object can be either stationary or revolving, for example, while the plasma gun may translate, rotate, or perform a combination of these motions relative to the object. The robot motion file 18 defines the number of translations, rotations, distances, angles of spray, and so on, needed to define the relative motion of the plasma gun and the geometric object (see FIG. 2).

Next, at block 122, the robot motion path file 18 (FIG. 1) is processed to generate the motion step file. The data from the robot motion file 18 is translated into a file containing the geometric x-y-z coordinates of the plasma spray gun relative to a stationary object, a dwell time at each position, and a vector defining the orientation of the spray gun relative to the object. As a typical robot produces a continuous motion path, the smaller the time increment utilized, the more accurate the coating thickness prediction will be. Each robot motion file is specifically tailored for a respective spray process and object geometry.

Finally, at block 124, a robot motion database 12 (FIG. 1) is generated containing each respective robot motion step file. At block 106, a particular robot motion step file 18 is selected and imported.

In blocks 126, 128, and 130 (FIG. 2), a geometric tracking module computes the effect of the spray on the object at each position in the motion step file.

At block 126, each motion position is read, one at a time. This data includes the gun position, orientation, and dwell time.

At block 128, the geometric tracking module determines which portions of the object geometry 26 (i.e. which facets) are visible. This is accomplished by first determining which facets fall within the cone of the spray pattern 22. This is done by collecting all of the facets whose centroids are within the cone of the spray pattern 22 at the current gun position. These facets are then subjected to a shadowing test to exclude all facets occluded by facets nearer to the spray gun nozzle (i.e. the module operates on the line-of-sight principle). The shadowed facets are determined by using the barycentric coordinates of one facet relative to another. The visible facets at this gun position are those facets that remain after this test.

Next, at block 130, the geometric tracking module computes a coating thickness at each visible facet based on the facet's position within the spray cone, the characterization polynomials for the spray pattern definition and the distance between the facet and spray gun (gun to substrate distance). This coupling between the geometric tracking module and the spray pattern 22 accounts for the non-flat surfaces of the object. The geometric tracking module also scales the coating thickness at each visible facet by the impact angle of the spray on the facet. For example, if the spray angle is perpendicular to the object geometry at a particular facet, then the full amount of the coating is applied there. However, if the spray angle is such that the facet is nearly parallel to the spray, then very little of the coating is applied.

At block 132 a determination is made as to whether the computations are complete or not. If the entire motion step file has been processed, then the method advances to block 134, otherwise, it returns to block 126 to process the next motion step.

At block 134, the coating thickness at each facet at each spray position is added to determine the predicted coating thickness for each facet on the part.

In one embodiment of this invention, two additional empirical factors are utilized typically sub routines within the base algorithm. Because the spray patterns are generated on flat (or "neutral") surfaces, these factors may be needed to account for the curvature effect in the real 3-D objects.

On a convex surface, where the part curves away from the spray gun, a "glancing" factor at block 136 may be needed to account for those particles that would stick to a flat surface but will scatter off the curved surface; this factor may be a function of the relative angle between the spray particles and the surface normal. The use of such a glancing factor would reduce the predicted thickness distribution over an actual part.

On a concave surface, where the part curves up towards the spray gun, a "rebounding" factor at block 138 may be needed to account for those particles that would scatter off one part of the curved surface but are captured by another part after bouncing inside the cup-like surface. The use of such a rebounding factor would increase the predicted thickness distribution over an actual part.

Both of these factors would be determined experimentally based on thickness comparisons between the experiments and model predictions, but may be fine tuned within the geometric tracking module through functions for the curvature and the gun-to-substrate distance. These factors may be included through post processing of the thickness predictions once the geometric tracking module has calculated the thickness distribution.

The methodology disclosed here can be used to estimate the powder efficiency associated with any spray motion path and any particular spray pattern definition (i.e., any particular set of processing conditions). To do this, an additional triangular finite element mesh is constructed to completely surround the existing object geometry. As the object geometry is sprayed, any parts of the spray cone that do not intersect the object will intersect this surrounding geometry. By calculating the powder captured by the object and by the surrounding geometry, an estimate of the percentage of powder striking the object an be generated. This calculation is quite valuable in designing the spray patterns for different object geometries—as the object geometry changes, the pattern can be adjusted to maximize the powder efficiency. Alternatively, instead of constructing the additional finite element mesh to capture the wasted powder, it is possible to integrate the area of the spray pattern over time, and to subtract the accumulated spray on the object geometry to compute the wasted powder.

EXAMPLE

Figure 7:
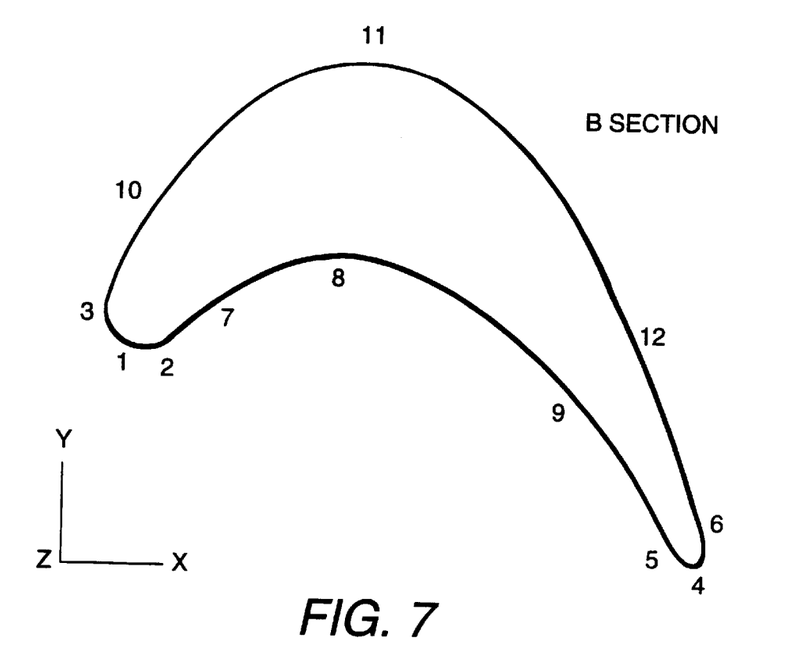
FIG. 7 depicts a schematic representation of the cross-section of a turbine bucket with locations at which thickness data was calculated in accordance with one embodiment of the instant invention.

Coating thickness distributions predicted by the methodology disclosed in this invention have been compared with coatings on turbine buckets that were produced by the VPS process. A representative spray motion file is displayed in FIG. 3, which shows the motion path of the spray gun relative to the stationary object geometry (where the scale in the horizontal direction has been exaggerated to show the motion more clearly). This motion path was broken down into approximately 1900 discrete positions. A representative spray pattern is contained in FIG. 4, while FIG. 5 shows the spray definition for this pattern, including its break-down into slices, each of which is represented by an $n^{th}$-degree polynomial. A representative finite element mesh of the object geometry, which is the surface of the turbine bucket showing the triangular facets needed by the geometric tracking module, is contained in FIG. 6. The designations A, B, and C indicate where the thickness data was extracted—section A was taken at 90% of the blade length, section B was taken at 50% of the length, and section C was taken at 10% of the length. FIG. 7 contains a representative sketch of the cross-section of the turbine bucket, with the numbers indicating those particular locations at which the coating thickness data was extracted. Based on this figure, the locations on the convex side of the bucket are 3, 10, 11, 12, and 6, while the locations on the concave side are 2, 7, 8, 9, and 5. The leading edge is at locations 3, 1, and 2, while the trailing edge locations are 5, 4, and 6.

An actual turbine bucket was sprayed using the robot program that generated the motion path shown in FIG. 3, under the same process conditions that generated the spray pattern shown in FIG. 4. The bucket was sectioned at the locations corresponding to designations A, B, and C in FIG. 6, and the sections were mounted, polished, and examined under a microscope in order to determine the coating thickness at the twelve locations marked in FIG. 7 for section B, and at similar locations for sections A and C.

Figure 8:
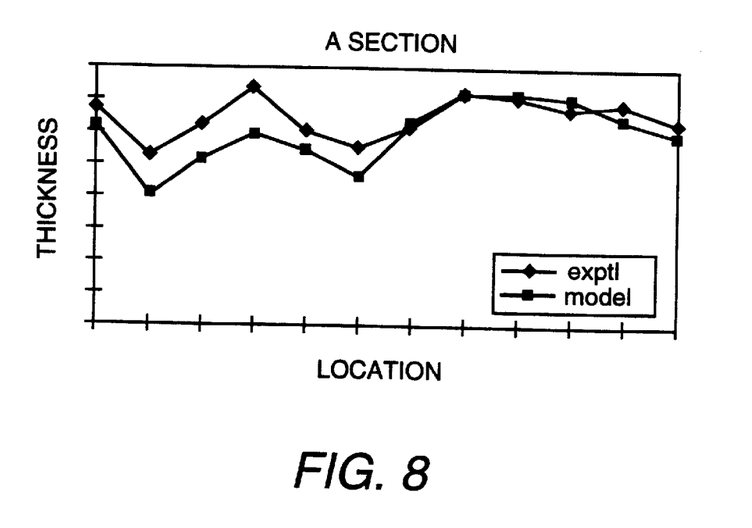
FIG. 8 is a graphical comparison of the predicted and measured thicknesses at selected locations in accordance with one embodiment of the instant invention.
Figure 9:
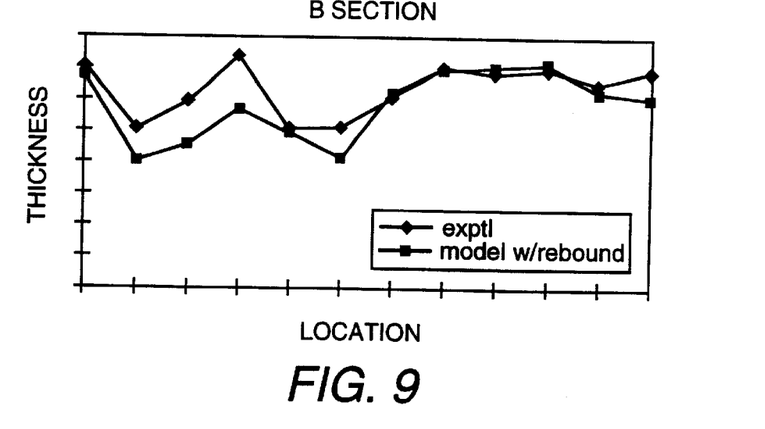
FIG. 9 is a graphical comparison of the predicted and measured thicknesses at selected locations in accordance with another embodiment of the instant invention.
Figure 10:
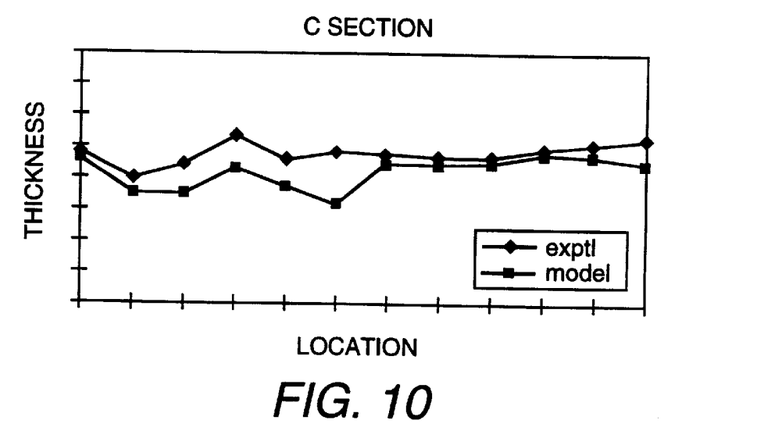
FIG. 10 is a graphical comparison of the predicted and measured thicknesses at selected locations in accordance with another embodiment of the instant invention.
Figure 11:
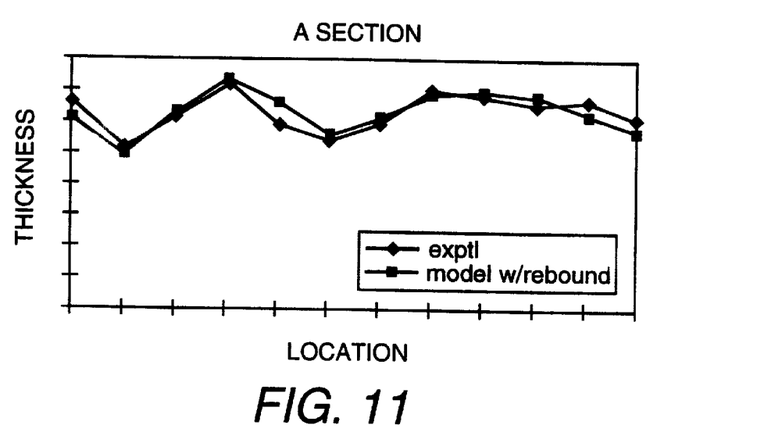
FIG. 11 is a graphical comparison of the predicted and measured thicknesses at selected locations in accordance with another embodiment of the instant invention.
Figure 12:
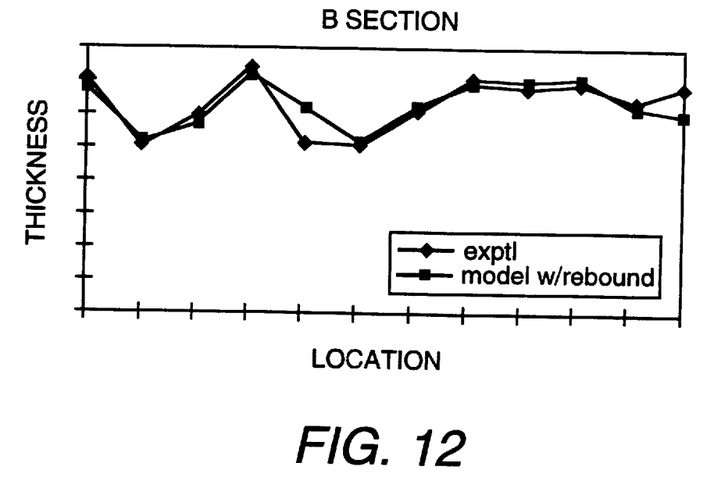
FIG. 12 is a graphical comparison of the predicted and measured thicknesses at selected locations in accordance with another embodiment of the instant invention.
Figure 13:
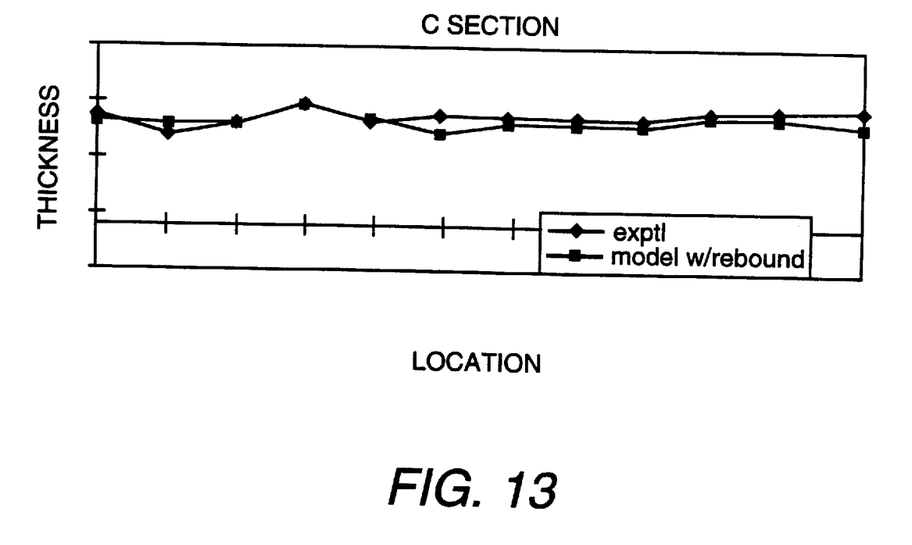
FIG. 13 is a graphical comparison of the predicted and measured thicknesses at selected locations in accordance with another embodiment of the instant invention.

FIGS. 8–10 contain a comparison of the predicted and measured thicknesses at these 36 locations. The comparison between the model (prediction) and experiment is very good at all locations except the concave side, where it appears that an empirical "rebounding" factor is needed to account for the behavior of the particles there compared with their behavior on the flat spray plate. FIGS. 11–13 contain a comparison of the predicted and measured thicknesses at these same locations after a calculated rebounding factor was applied to the locations on the concave side.

Although the test case presented in this invention disclosure uses the vacuum plasma spray (VPS) process to deposit the powder, the methodology is not limited to this spray process; it can be translated for the thermal barrier coating (TBC) process, the high-velocity oxygen flow (HVOF) process, and other spray coating processes as well.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A spray coating simulation for a robotic spray gun assembly comprising the steps of:
   importing a discretized model of an object geometry to be coated;
   importing a numerically characterized spray pattern file;
   importing a robot motion file comprising a plurality of motion positions, dwell times and orientations defining a spray direction of said robot spray gun;
   reading each motion position within said motion file;
   determining which portions of said object geometry are visible at each motion position;
   computing a coating thickness at each visible portion of said object geometry based on said spray pattern data, said dwell time and said orientation of said spray direction for each motion position; and
   calculating total coating thickness on portions of said object geometry for said complete motion step.

2. A spray coating simulation for a robotic spray gun assembly in accordance with claim 1, wherein said step of importing a discretized model of an object geometry to be coated comprises:
   creating a three-dimensional model of an object to be coated;
   enveloping said three-dimensional model with a finite element mesh having a plurality of facets; and enriching said plurality of facets with additional mathematical identifiers.

3. A spray coating simulation for a robotic spray gun assembly in accordance with claim 1, wherein said step of importing spray pattern file comprises:
   spraying a plurality of test plates to identify respective spray gun pattern distribution characteristics of respective spray patterns;
   numerically characterizing each respective spray pattern; and
   generating a spray pattern database comprising said plurality of numerically characterized spray patterns.

4. A spray coating simulation for a robotic spray gun assembly in accordance with claim 1, wherein said step of importing a motion step file comprising a plurality of motion positions, dwell times and orientations, comprises: generating a plurality of robot motion files; translating each respective motion file into x-y-z coordinates of said spray gun, a dwell time at each position, and a vector defining the orientation of said spray gun relative to said object geometry; and generating a robot motion database containing a plurality of motion step files.

5. A spray coating process in accordance with claim 2, wherein said three dimensional model is created using a computer aided design software application.

6. A spray coating process in accordance with claim 2, wherein said additional mathematical identifiers comprise an area, a centroid location, and a facet normal.

7. A spray coating process in accordance with claim 1, wherein said process is in algorithm form loaded within a computer.

8. A spray coating process in accordance with claim 3, wherein said spray patterns are numerically characterized as a series of nth degrees polynomials representing thickness at various slices through said test plate, a cone angle, and the height of characterization.

9. A spray coating process in accordance with claim 2, wherein said step of determining which portions of said object geometry are visible at each motion step comprises:
   determining which facets fall within the spray pattern by determining which facet centroids are within the spray pattern at the current position; and
   subjecting these facets to a shadowing test to exclude all facets occluded by facets closer to said spray gun by using the barycentric coordinates of one facet relative to another.

10. A spray in accordance with claim 1, further comprising:
    using a glancing factor on a convex surface geometry to account for spray coating that stick to a flat surface but scatter from a curved surface.

11. A spray in accordance with claim 1, further comprising:
    using a rebounding factor on a concave surface geometry to account for spray coating that scatter off of a portion of a curved surface but are captured by another portion.

12. A system for predicting spray-coating thickness in a robotic spray-gun process, comprising:
    an importer for importing a discretized model of an object geometry;
    a spray pattern database containing a plurality of numerically characterized spray pattern files;
    a robot motion database containing a plurality of robot motion files; and
    a geometric tracking module for computing a spray coating thickness at each position in a respective robot motion file by reading each position, determining which portions of said object geometry are visible at each position, computing a coating thickness at each visible portion of said object geometry based on said spray pattern data, said dwell time and said orientation of said robot motion path for each motion position and calculating total coating thickness for said complete motion step file.

13. A system in accordance with claim 12, wherein a system user selects and imports a motion path file from said robot motion database and a spray pattern file from said spray pattern database for use within said geometric tracking module.

14. A system in accordance with claim 12, wherein said system is utilized in algorithm form in a computer.

15. A system in accordance with claim 12, wherein said algorithm is programmed in C++.

* * * * *